(12) United States Patent
Vazhenin et al.

(10) Patent No.: US 9,007,706 B1
(45) Date of Patent: Apr. 14, 2015

(54) DISK SYNCHRONIZING

(71) Applicant: EMC Corporation, Hopkinton, MA (US)

(72) Inventors: Maksim Vazhenin, Saint Petersburg (RU); Sergey Storozhevykh, Saint Petersburg (RU); Ilya Volzhev, Saint Petersburg (RU); Vadim Agarkov, Saint Petersburg (RU)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 14/492,185

(22) Filed: Sep. 22, 2014

(51) Int. Cl.
| | |
|---|---|
| *G11B 5/02* | (2006.01) |
| *G11B 20/10* | (2006.01) |
| *G11B 20/12* | (2006.01) |
| *G06F 3/06* | (2006.01) |

(52) U.S. Cl.
CPC ............... *G11B 5/02* (2013.01); *G06F 3/0647* (2013.01); *G11B 20/10* (2013.01); *G11B 20/1217* (2013.01); *G06F 3/0619* (2013.01); *G06F 3/0689* (2013.01); *G11B 20/1258* (2013.01)

(58) Field of Classification Search
CPC .. G11B 20/10; G11B 7/005; G11B 20/10527; G11B 7/0037; G11B 20/00086; G11B 21/025; G11B 20/1258; G11B 2020/10916; G11B 5/6011; G11B 5/02

USPC ................. 360/13, 55, 75, 78.08, 53, 39, 31, 360/78.04, 48, 70
See application file for complete search history.

(56) References Cited

U.S. PATENT DOCUMENTS 8,134,798 B1 * 3/2012 Thelin et al. ............... 360/78.04

OTHER PUBLICATIONS

Vazhenin et al., "Disk Synchronizing;" U.S. Appl. No. 14/315,414, filed Jun. 26, 2014; 19 Pages.

* cited by examiner

*Primary Examiner* — Ali Neyzari
(74) *Attorney, Agent, or Firm* — Daly, Crowley, Mofford & Durkee, LLP

(57) ABSTRACT

In one aspect, a method includes performing synchronization between a source disk and a target disk. The performing includes reading data, in a first read, with a first size from a source disk, writing the data from the first to a target disk, reading data, in a second read, with the first size from the source disk, determining if the data from the first read is equal to the data from the second read, reducing the first size if the data from the first read is not equal to the data in the second read and repeating the reading data in the first read, the writing, the reading data in the second read and the determining.

19 Claims, 3 Drawing Sheets

DISK SYNCHRONIZING

BACKGROUND

Computer systems are constantly improving in terms of speed, reliability, and processing capability. As is known in the art, computer systems which process and store large amounts of data typically include a one or more processors in communication with a shared data storage system in which the data is stored. The data storage system may include one or more storage devices, usually of a fairly robust nature and useful for storage typically include an array of a plurality of disks with on-board intelligence and communications electronics and software for making the data on the disks available.

Disks migration enables non-disruptive or minimally disruptive data migration between data storage systems. The major part of the time in migration is consumed by synchronization of the source and target disks. For any solution which provides the functionality for migrating data it is important to minimize the time needed to synchronize the disks which are being migrated.

SUMMARY

In one aspect, a method includes performing synchronization between a source disk and a target disk. The performing includes reading data, in a first read, with a first size from a source disk, writing the data from the first to a target disk, reading data, in a second read, with the first size from the source disk, determining if the data from the first read is equal to the data from the second read, reducing the first size if the data from the first read is not equal to the data in the second read and repeating the reading data in the first read, the writing, the reading data in the second read and the determining.

In another aspect, an apparatus includes electronic hardware circuitry configured to perform synchronization between a source disk and a target disk. The circuitry configured to perform the synchronization includes circuitry configured to read data, in a first read, with a first size from a source disk, write the data from the first to a target disk, read data, in a second read, with the first size from the source disk, determine if the data from the first read is equal to the data from the second read, reduce the first size if the data from the first read, is not equal to the data in the second read and repeat the reading data in the first read, the writing, reading data in the second read and the determining.

In a further aspect, an article includes a non-transitory computer-readable medium that stores computer-executable instructions. The instructions cause a machine to perform synchronization between a source disk and a target disk. The instructions causing the machine to perform the synchronization include instructions causing the machine to read data, in a first read, with a first size from a source disk, write the data from the first to a target disk, read data, in a second read, with the first size from the source disk, determine if the data from the first read is equal to the data from the second read, reduce the first size if the data from the first read is not equal to the data in the second read and repeat the reading data in the first read, the writing, reading data in the second read and the determining.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts.

Thus, features and advantages of the present disclosure will become more apparent from the following detailed description of exemplary embodiments thereof taken in conjunction with the accompanying drawings in which.

Like reference symbols in the various drawings indicate like elements.

DETAILED DESCRIPTION

Active-Active clusters enable multiple nodes in a high availability cluster to simultaneously have read-write access to the same LUN (disk). High availability clusters provide continued service for the users. Most products which provide functionality to non-disruptively migrate one disk (source) to another (target) should solve the problem of synchronizing the disks. Synchronization of the disk usually involves cloning new I/Os to both the source and the target while copying disk block by block. The synchronization problem becomes more difficult to solve in active-active cluster environment when several hosts can access the source disk, because the node which performs copy sweep should handle conflicts between I/O from all nodes to the disk with the currently running copy sweep to guarantee that the disks will be synchronized correctly.

Described herein are techniques for source and target disk synchronization in an active-active cluster environment which does not involve communication between nodes for copy sweep. That is, synchronization of source and target disks is performed by one node without communication with other nodes in the cluster. With this approach copy sweep efficiency may be achieved without cost-consuming communication between nodes while ensuring consistency of the data on the source and target disks during synchronization on copy sweep.

Figure 1:
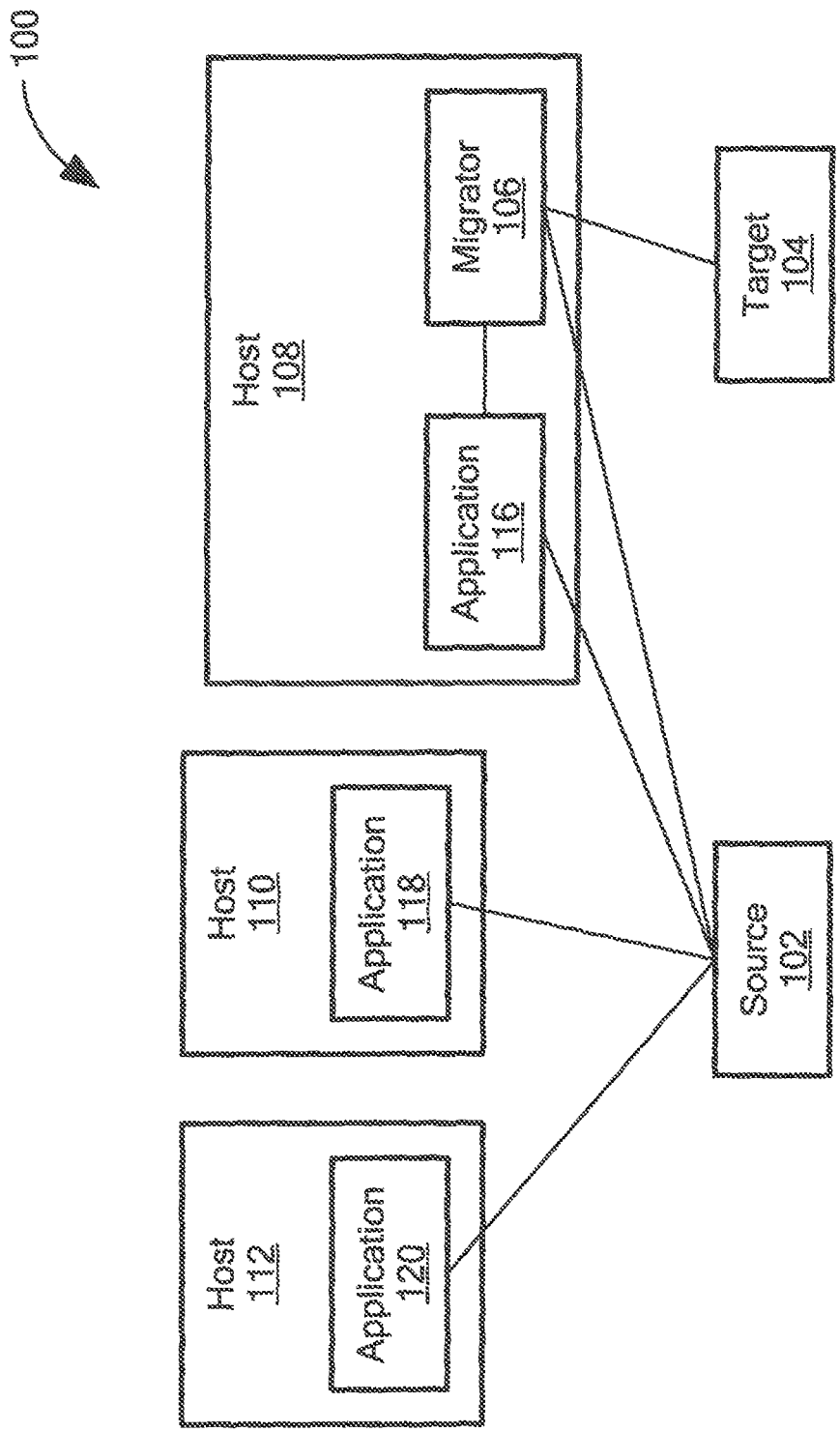
FIG. 1 is a simplified block diagram of an example of a disk migration system.

Referring to FIG. 1, a disk migration system 100 includes a source disk 102, a target disk 104, a cluster of hosts (e.g., a host 108, a host 110 and a host 112). The host 108 includes a migrator 106 and an application 116. The host 110 includes an application 118 and the host 112 includes the application 120. The migrator 106 migrates data from the source disk 102 to a target disk 104. In order for the migration to take place the source disk 102 and the target disk 104 are synchronized with each other. Though the migrator 106 may run on the host 108, in other examples, the host 108 and the migrator 106 may be two separate components.

When migration starts the source disk 102 and the target disk 104 are not synchronized. The migrator 106 synchronizes the source disk 102 and the target disk (e.g., using a process 200 (FIG. 2)) while application I/Os are accessing the source disk 102. An I/O (input/output) are read requests (read I/Os) that read from a disk or write requests (write I/Os) that write to the disk.

During this synchronization process, the system 100 is configured to clone any new application write I/Os from source disk 102 to the target disk 104. Even after synchronization is complete system 100 continues to clone any new application write I/Os from source to target to keep the disks synchronized. In one particular, the cloned write I/Os are saved in the order that they are received. In one particular example, cloning write I/Os may be performed before, during or after the performing the synchronization process or any combination thereof. In one particular example, the write I/Os from an application are cloned after they are written to the source disk 102.

System 100 is also configured to prevent writes to the target 104 by the applications 116, 118, 120; however, the migrator 106 does have access to the target 104.

Figure 2:
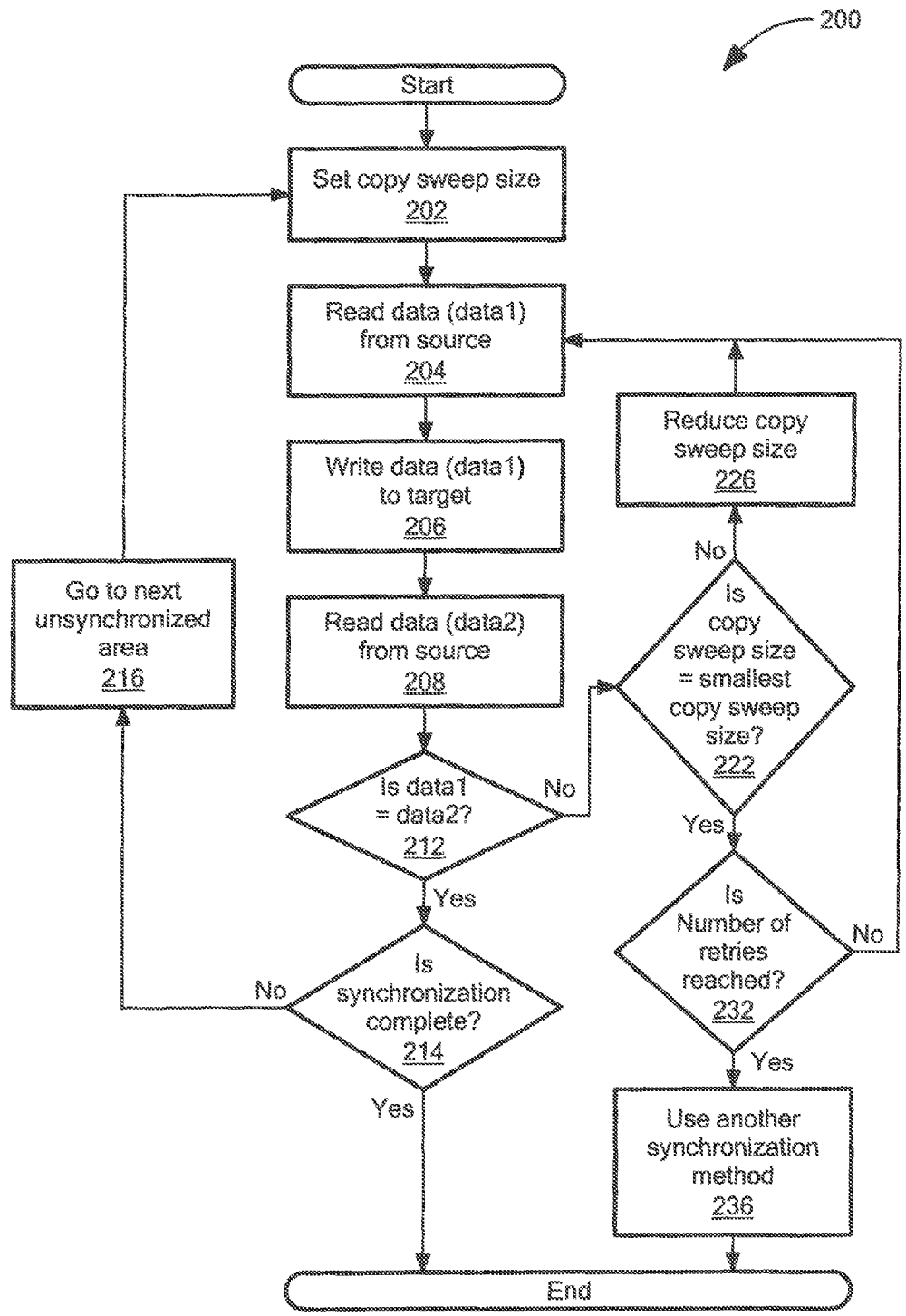
FIG. 2 is a simplified flow chart of an example of a portion of process to synchronize a source disk to a target disk performed by a migrator in FIG. 1.

Referring to FIG. 2, an example of a process to perform synchronization is a process 200. Process 200 sets the copy sweep size (202). During copy sweep, chunks of data are copied and sent from a source disk to a target disk one at time until disk synchronization is complete. A chunk is the copy sweep size. In one example, the copy sweep size is set to 64 times the block size. In one particular example, the copy sweep size is set to the 256 kB.

Process 200 reads data (data1) from a source disk (204). For example, the data has a size equal to the copy sweep size is read from the source disk 102.

Process 200 writes the data (data1) to a target disk (206). For example, the data read from processing block 204 is written to processing the target disk 104.

Process 200 reads data from the source disk (208). The data read is in the same location as data read in processing block 204.

Process 200 determines if data1 equals data2 (212). If data1 does equal data2, process determines is synchronization is complete (214) and if synchronization is not complete, process 200 goes to the next unsynchronized area (216), and repeats processing blocks 202, 204, 206, 208 and 212. In particular, the copy sweep size is reset or remains at the largest value copy sweep size at the beginning of the process 200 that is set in processing block 202.

If data1 does not equal data2, process 200 determines if the smallest copy sweep size is being used (222) and if the smallest copy sweep size is not being used, process 200 reduces the copy sweep size (226) and repeats processing blocks 204, 206, 208 and 212 with this new value. In one example, the copy sweep size is reduced by half. In one example, the smallest copy sweep size is a size of the smallest data block, which is one disk sector size. In one particular example, the smallest copy sweep size is 4 kB.

If the smallest copy sweep size is being used, process 200 determines if the number of retries at the smallest copy size have been reached (232) and if the number of retries at the smallest copy size has not been reached, process 200 repeats processing blocks 204, 206, 208 and 212.

If the number of retries at the smallest copy size has been reached, process 200 uses another synchronization method (236). In other examples, an evaluation process is initiated to determine the failure.

Figure 3:
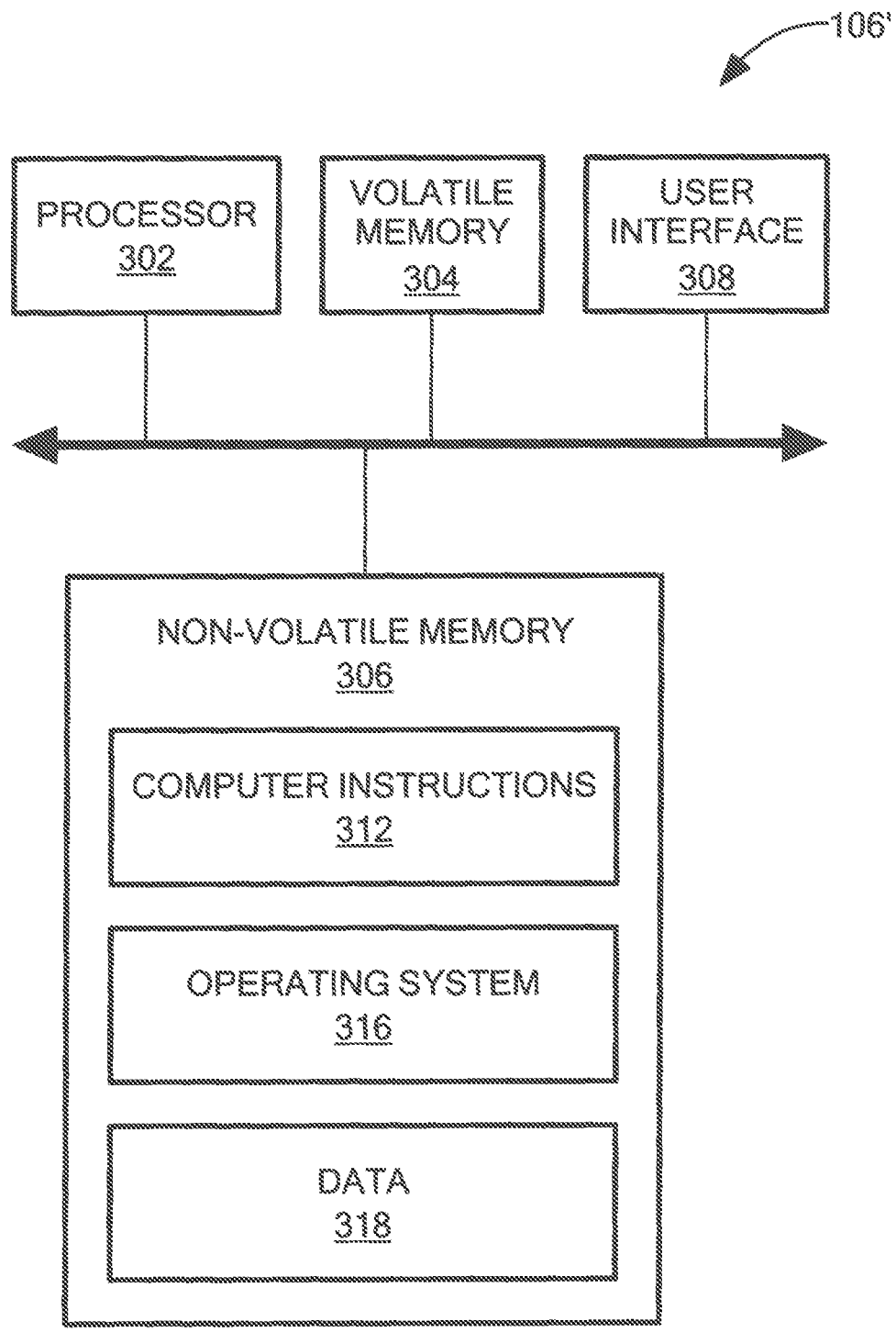
FIG. 3 is a simplified block diagram of an example of a computer on which any of the process of FIG. 2 may be implemented.

Referring to FIG. 3, an example of a migrator 106 is a migrator 106'. The migrator 106' includes a processor 302, a volatile memory 304, a non-volatile memory 306 (e.g., hard disk) and the user interface (UI) 308 (e.g., a graphical user interface, a mouse, a keyboard, a display, touch screen and so forth). The non-volatile memory 306 stores computer instructions 312, an operating system 316 and data 318. In one example, the computer instructions 312 are executed by the processor 302 out of volatile memory 304 to perform all or part of the processes described herein (e.g., process 200).

The processes described herein (e.g., process 200) are not limited to use with the hardware and software of FIG. 3; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and, it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory; magnetic diskette and so forth but does not include a transitory signal per se.

The processes described herein are not limited to the specific examples described. For example, the process 200 is not limited to the specific processing order of FIG. 2.

The processing blocks (for example, in the process 200) associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form, other embodiments not specifically set forth above. Various elements, which are described in the context of a single embodiment may also be provided separately or in any suitable subcombination. Other embodiments not specifically described herein are also within the scope of the following claims.

What is claimed is:

1. A method, comprising:
   performing synchronization between a source disk and a target disk, the performing comprising:
   reading data, in a first read, with a first size from a source disk;
   writing the data from the first to a target disk;
   reading data, in a second read, with the first size from the source disk;
   determining if the data from the first read is equal to the data from the second read;
   reducing the first size if the data from the first read is not equal to the data in the second read; and
   repeating the reading data in the first read, the writing, the reading data in the second read and the determining.

2. The method of claim 1, wherein the performing further comprises synchronizing a next unsynchronized portion of the source and target disks and repeating the reading data in the first read, the writing, the reading data in the second read and the determining if the data from the first read is equal to the data from the second read.

3. The method of claim 1, further comprising cloning write I/Os from an application written to the source disk and writing the write I/Os to the target disk.

4. The method of claim 3, wherein cloning write I/Os Os comprises cloning write I/Os before, during or after the performing the synchronizing.

5. The method of claim 1 wherein reducing the first size comprises reducing the first size no smaller than a size of a sector of storage.

6. The method of claim 1, further comprising limiting a number of retries at the first size equal to the size of the sector of storage.

7. An apparatus, comprising:
   electronic hardware circuitry configured to:
   perform synchronization between a source disk and a target disk, the circuitry configured to perform the synchronization comprises circuitry configured to:
   read data, in a first read, with a first size from a source disk;
   write the data from the first to a target disk;
   read data, in a second read, with the first size from the source disk;
   determine if the data from the first read is equal to the data from the second read;
   reduce the first size if the data from the first read is not equal to the data in the second read; and
   repeat the reading data in the first read, the writing, reading data in the second read and the determining.

8. The apparatus of claim 7, wherein the circuitry comprises at least one of a processor, a memory, a programmable logic device or a logic gate.

9. The apparatus of claim 7, wherein the circuitry configured to perform the synchronization further comprises circuitry configured to synchronize a next unsynchronized portion of the source and target disks and repeating the reading data in the first read, the writing, the reading data in the second read and the determining if the data from the first read is equal to the data from the second read.

10. The apparatus of claim 7, further comprising circuitry configured to clone write I/Os from an application written to the source disk and writing the write I/Os to the target disk.

11. The apparatus of claim 10, wherein the circuitry configured to clone write I/Os comprises circuitry configured to clone write I/Os before, during or after the performing the synchronizing.

12. The apparatus of claim 7, wherein the circuitry configured to reduce the first size comprises circuitry configured to reduce the first size no smaller than a size of a sector of storage.

13. The apparatus of claim 7, further comprising circuitry configured to limit a number of retries at the first size equal to the size of the sector of storage.

14. An article comprising:
   a non-transitory computer-readable medium that stores computer-executable instructions, the instructions causing a machine to perform synchronization between a source disk and a target disk, the instructions causing the machine to perform the synchronization comprises the instructions causing the machine to:
   read data, in a first read, with a first size from a source disk;
   write the data from the first to a target disk;
   read data, in a second read, with the first size from the source disk;
   determine if the data from the first read is equal to the data from the second read;
   reduce the first size if the data from the first read is not equal to the data in the second read; and
   repeat the reading data in the first read, the writing, reading data in the second read and the determining.

15. The article of claim 14, wherein the circuitry configured to perform the synchronization further comprises instructions causing the machine to synchronize a next unsynchronized portion of the source and target disks and repeating the reading data in the first read, the writing, the reading data in the second read and the determining if the data from the first read is equal to the data from the second read.

16. The article of claim 14, further comprising instructions causing the machine to clone write I/Os from an application written to the source disk and writing the write I/Os to the target disk.

17. The article of claim 16, wherein the instructions causing the machine to clone write I/Os comprises instructions causing the machine to clone write i/Os before, during or after the performing the synchronizing.

18. The article of claim 14, wherein the instructions causing the machine to reduce the first size comprises instructions causing the machine to reduce the first size no smaller than a size of a sector of storage.

19. The article of claim 14, further comprising instructions causing the machine to limit a number of retries at the first size equal to the size of the sector of storage.

* * * * *